United States Patent
Davies

[15] 3,703,103
[45] Nov. 21, 1972

[54] MECHANISM FOR PRODUCING RECTILINEAR MOTION

[72] Inventor: Robert William Davies, London, England

[73] Assignee: Molins Limited, London, England

[22] Filed: Feb. 4, 1971

[21] Appl. No.: 112,740

[30] Foreign Application Priority Data

Feb. 9, 1970 Great Britain............6,033/70

[52] U.S. Cl. .................................................74/86
[51] Int. Cl. ............................................F16h 35/16
[58] Field of Search....................................74/52, 86

[56] References Cited

UNITED STATES PATENTS 1,510,976 10/1924 Carrie......................74/86 UX

Primary Examiner—Milton Kaufman
Attorney—Craig, Antonelli, Stewart & Hill

[57] ABSTRACT

A mechanism for moving a support member in a substantially rectilinear polygonal path having $n$ sides comprises a first sun gear engaged by a first planet gear, mounted on a first planet carrier which is rotated about the sun gear and also carries a second planet gear which engages the first planet gear; a second sun gear coaxial with the second planet gear is non-rotatably fixed to the first planet carrier; a second planet carrier, fixed to the second planet gear, and on which is rotatably mounted a third planet gear in engagement with the second sun gear and a fourth planet gear engaging the third planet gear, the support member being fixed to the fourth planet gear; the rectilinearity of the polygonal path is improved by rotating the first sun gear to and fro cyclically in synchronism with the rotation of the first planet carrier so that $n$ cycles of movement of the first sun gear take place during each revolution of the first planet carrier.

4 Claims, 2 Drawing Figures

PATENTED NOV 21 1972

3,703,103

INVENTOR
ROBERT WILLIAM DAVIES
BY Craig, Antonelli, Stewart & Hill
ATTORNEYS

MECHANISM FOR PRODUCING RECTILINEAR MOTION

The present invention relates to mechanism for producing rectilinear motion, more particularly mechanism for moving a member in a substantially rectilinear polygonal path in which the attitude i.e., orientation of the member being moved is maintained constant with respect to a fixed reference outside the mechanism.

According to the present invention there is provided a mechanism for moving a support member in a substantially rectilinear polygonal path having $n$ sides, which comprises:

a. a first sun gear engaged by a first planet gear mounted on a first planet carrier and means to rotate said carrier about the first sun gear;

b. a second planet gear also mounted on said first planet carrier and engaging said first planet gear;

c. a second sun gear coaxial with said second planet gear and non-rotatably fixed to said first planet carrier;

d. a second planet carrier, fixed to said second planet gear, and on which is rotatably mounted a third planet gear in engagement with said second sun gear;

e. a fourth plane gear, rotatably mounted on said second planet carrier and engaging said third planet gear, and on which said support member is fixed;

wherein the ratio of the diameters of said first sun gear and said second planet gear is $n:1$, and the ratio of the diameters of said second sun gear and said fourth planet gear is $(n-1):n$.

With such an arrangement, an appropriate selection of the relative diameters of the gears will enable the fourth planet gear to traverse a closed polygonal path which may have three, four or more sides depending upon the diameters of the various gears and their positions relatively to one another.

The sides of the polygonal path may be made more nearly rectilinear by also providing further means to rotate said first sun gear to and fro cyclically in synchronism with the rotation of said first planet carrier so that $n$ cycles of movement of said first sun gear take place during each revolution of said first planet carrier.

Various other preferred features of mechanism embodying the invention may be carried out and will be found in the following description, given by way of example only, of one preferred embodiment thereof, in which description reference is made to the accompanying drawings in which.

Figure 1:
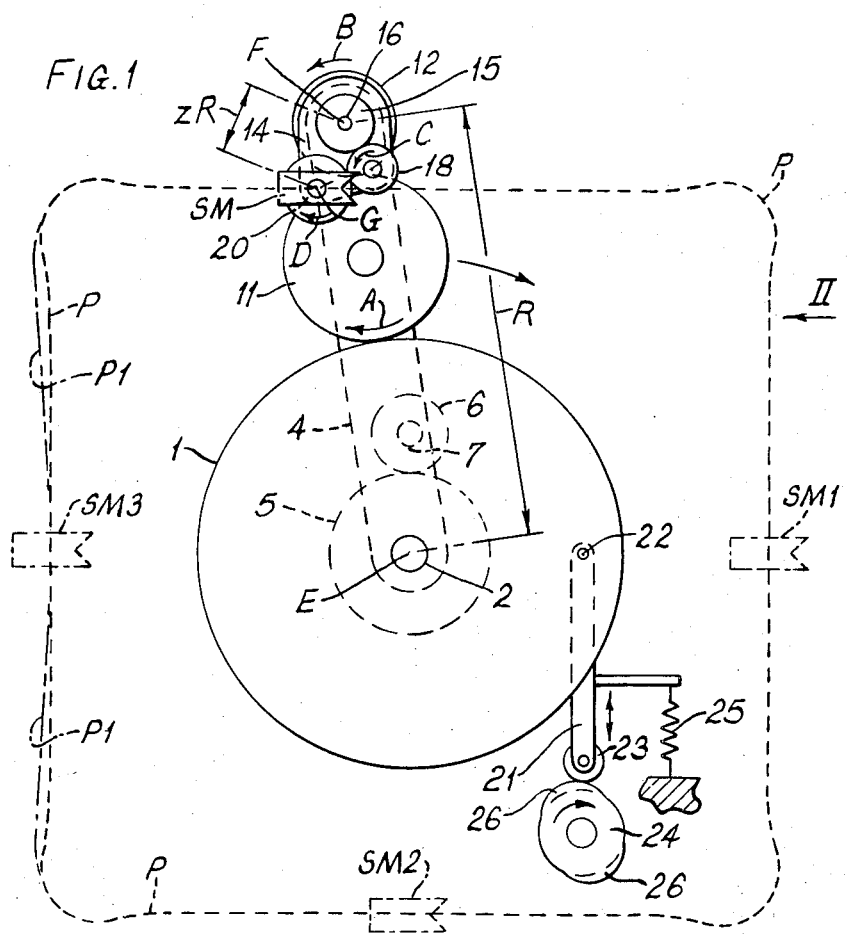
FIG. 1 is a schematic representation of one embodiment of the invention.

The mechanism shown in the drawings is arranged to move a support member SM in a substantially polygonal path and keep the member SM in the same orientation as it is moved along the path. In FIG. 1 the member SM is shown in chain-dot lines in a number of positions SM1–SM3 through which it passes while being moved along the path, and for clarity no teeth are shown on the gear wheels.

Figure 2:
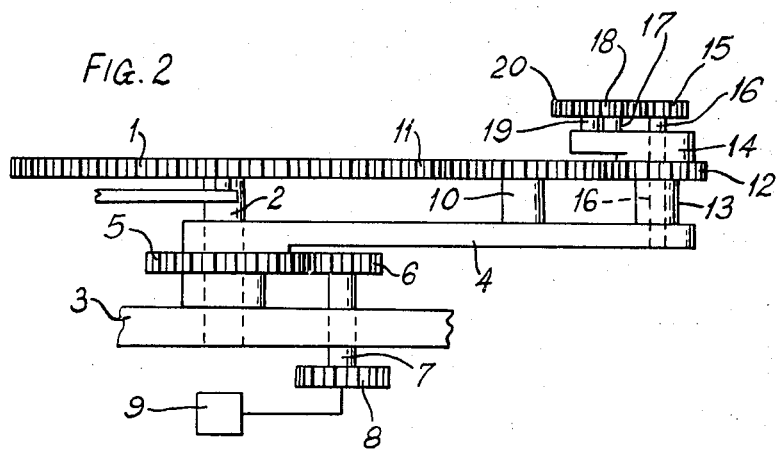
FIG. 2 is a side view of the mechanism shown in FIG. 1 taken in the direction of the arrow II.

A first sun gear 1 is journalled on one end of a shaft 2 the other end of which is non-rotatably fixed to a base plate 3. Said sun gear 1 is held against rotation, except for controlled small movements, as will be later described. A first planet carrier 4 is rotatably-mounted on the shaft 2 and fixed to a gear wheel 5 which is also rotatably mounted on the shaft 2. The gear 5 meshes with a further gear 6 which is carried on one end of a short drive shaft 7, which passes through and is rotatably mounted in the base plate 3. The other end of the shaft 7 carries a gear 8 which is driven in any convenient manner from a drive unit diagrammatically illustrated at 9 in FIG. 2.

Rotatably carried on the planet carrier 4, by means of a stub shaft 10, is a first planet gear 11 which meshes with the sun gear 1. A second planet gear 12 also rotatably carried on the planet carrier 4, by means of a hollow stub shaft 13, meshes with the planet gear 11. A second planet carrier 14 is fixed to and rotatable with the second planet gear 12. With the mechanism so far described, as the planet carrier 4 is rotated clockwise about the axis of the shaft 2, from the drive unit 9 via gears 8, 6 and 5, the planet gears 11 and 12 are carried round the sun gear 1 and therefore rotate about their own axes in a clock-wise and counter-clockwise direction respectively, as shown by arrows A and B in FIG. 1. The second planet carrier 14 will therefore be rotated about the axis of the planet gear 12 in a counter-clockwise direction.

A second sun gear 15 is fixed to one end of a shaft 16, which passes through the hollow shaft 13, the other end being non-rotatably mounted in the plant carrier 4. Thus the sun gear 15 does not rotate about the axis of the shaft 16. Rotatably mounted on the planet carrier 14, by means of a stub shaft 17, is a third planet gear 18 which meshes with the sun gear 15, and by means of a stub shaft 19, a fourth planet gear 20 which meshes with the planet gear 18. The support member SM is fixed to the fourth planet gear 20. As stated above, the planet carrier 14 rotates in a counter-clockwise direction about the axis of the shaft 13, so therefore the planet gears 18, 20 will be carried round with it, which results in the planet gears 18, 20 rotating about their own axis in a counter-clockwise and clockwise direction respectively, as shown by arrows C, D in FIG. 1. The direction of rotation of the planet gear 20 is such, in relation to that of the planet carrier 14, that the orientation of the support member SM remains the same as it is carried round the axis of the sun gear 1 by the plane carrier 4.

The diameter of the gears 1 and 12 are selected to be in the ratio of 4:1 and the diameters of the gears 15 and 20 are selected to be in the ratio of 3:4.

If the axis of the sun gear 1 is indicated by E, the axis of the sun gear 15 by F and the axis of the fourth planet gear 20 by G; and if the distances EF and FG are R and zR respectively, where z is a constant, then the position of the point G can be expressed by the following formula:

$$y = R \cos \theta + (zR) \cos (180 - (n-1) \theta)$$

where $y$ is the distance between the points E and G, $\theta$ is the angle through which the planet carrier 4 has been rotated from any given starting position, and $n$ is the number of sides possessed by the polygonal path traversed by the point G. The quantity $z$ is a constant (selected as below) but is different for figures having different numbers of sides. Suitable values of $z$ are:

For $n = 4, z = 0.134$ and for $n = 3, z = 0.293$.

With the arrangement so far described the point G will traverse a substantially square path, but the sides of the square will have a slight inward curvature, i.e., the center of each side will be closer to the point E than in a perfect square. In order to minimize this curvature it has been found convenient to select the value of z so as to reduce to a minimum the sum of the squares of the deviations of the curved sides from a straight line. However, to provide a polygonal path which is even closer to straight line along its sides, the mechanism shown has further parts now to be described.

One end of an arm 21 is pivotally connected at 22 to the sun gear 1, and the other end carries a cam follower in the form of a roller 23. The roller 23 is held in contact with a cam 24 by a spring 25. The cam 24 is provided with two lobes 26, each lobe serving to cause the sun gear 1 to be rotated a small amount about its own axis, as mentioned earlier, in a counter-clockwise direction as the roller 23 runs up one side of the lobe and in a clockwise direction as the roller 23 runs down the other side of the lobe. The cam is positioned so that each lobe causes rotation of the sun gear 1 as the point G is moving between two consecutive corners of the substantially square path, the peak of a lobe reaching the follower roller 23 as the point G is midway between said corners.

This rotation of the sun gear 1 results in the point G being speeded up in its counter-clockwise rotation about the point B while the point G is moving from approximately the beginning of one side of the substantially square path to the middle of said side; and slowed down in its counter-clockwise rotation about the point B while it is moving from the middle of said side to approximately the end of said side. As a practical matter it has been found that the length of that portion of said side along which the cam 24 can conveniently be made to cause the point G to move in a straight line, is such that, on each side of the mid-point of the side, the straight portion subtends an angle of 30° at the point E.

As the cam 24 has only two lobes 26, and the path along which the point G travels has four sides, the cam has to be rotated two revolutions for each revolution of the planet carrier 4 about the point E.

In FIG. 1 the path that the point G traverses is shown by a dotted line P and a further line P1, (shown chain-dotted along one side only) shows the path that the point G would traverse if the sun gear 1 was not rotated by cam 24 as described above.

What I claim as my invention and desire to secure by Letters Patent is:-

1. A mechanism for moving a support member in a substantially rectilinear polygonal path having $n$ sides, which comprises
    a. a first sun gear engaged by a first planet gear mounted on a first planet carrier and means to rotate said carrier about the first sun gear;
    b. a second planet gear also mounted on said first plane carrier and engaging said first planet gear;
    c. a second sun gear coaxial with said second planet gear and non-rotatably fixed to said first planet carrier;
    d. a second planet carrier, fixed to said second planet gear, and on which is rotatably mounted a third planet gear in engagement with said second sun gear;
    e. a fourth plane gear, rotatably mounted on said second planet carrier and engaging said third planet gear, and on which said support member is fixed;

wherein the ratio of the diameters of said first sun gear and said second planet gear is $n:1$, and the ratio of the diameters of said second sun gear and said fourth planet gear is $(n-1):n$.

2. A mechanism as claimed in claim 1 comprising further means to rotate said first sun gear to and fro cyclically in synchronism with the rotation of said first planet carrier so that $n$ cycles of movement of said first sun gear take place during each revolution of said first planet carrier.

3. A mechanism as claimed in claim 2 wherein said further means comprises a cam, a cam follower, resilient means arranged to keep said cam follower in contact with said cam and means connecting said cam follower to one face of said first sun gear.

4. A mechanism as claimed in claim 3 wherein said connecting means is an arm, one end of which carries said cam follower, and the other end of which is pivotally attached to said face of said first sun gear.

* * * * *